HUMIDIFIER

Original Filed Jan. 23, 1961 4 Sheets-Sheet 1

INVENTORS
CLIFFORD HOTCHKISS
LOURDES V. McCARTY
BY Bayard H. Michael
ATTORNEY

HUMIDIFIER

Original Filed Jan. 23, 1961 4 Sheets-Sheet 2

INVENTORS
CLIFFORD HOTCHKISS
LOURDES V. McCARTY
BY Bayard B. Michael
ATTORNEY

HUMIDIFIER

Original Filed Jan. 23, 1961 4 Sheets-Sheet 3

INVENTORS
CLIFFORD HOTCHKISS
LOURDES V. McCARTY
BY Bayard P. Michael
ATTORNEY

Aug. 1, 1967 C. HOTCHKISS ETAL Re. 26,243
HUMIDIFIER
Original Filed Jan. 23, 1961 4 Sheets-Sheet
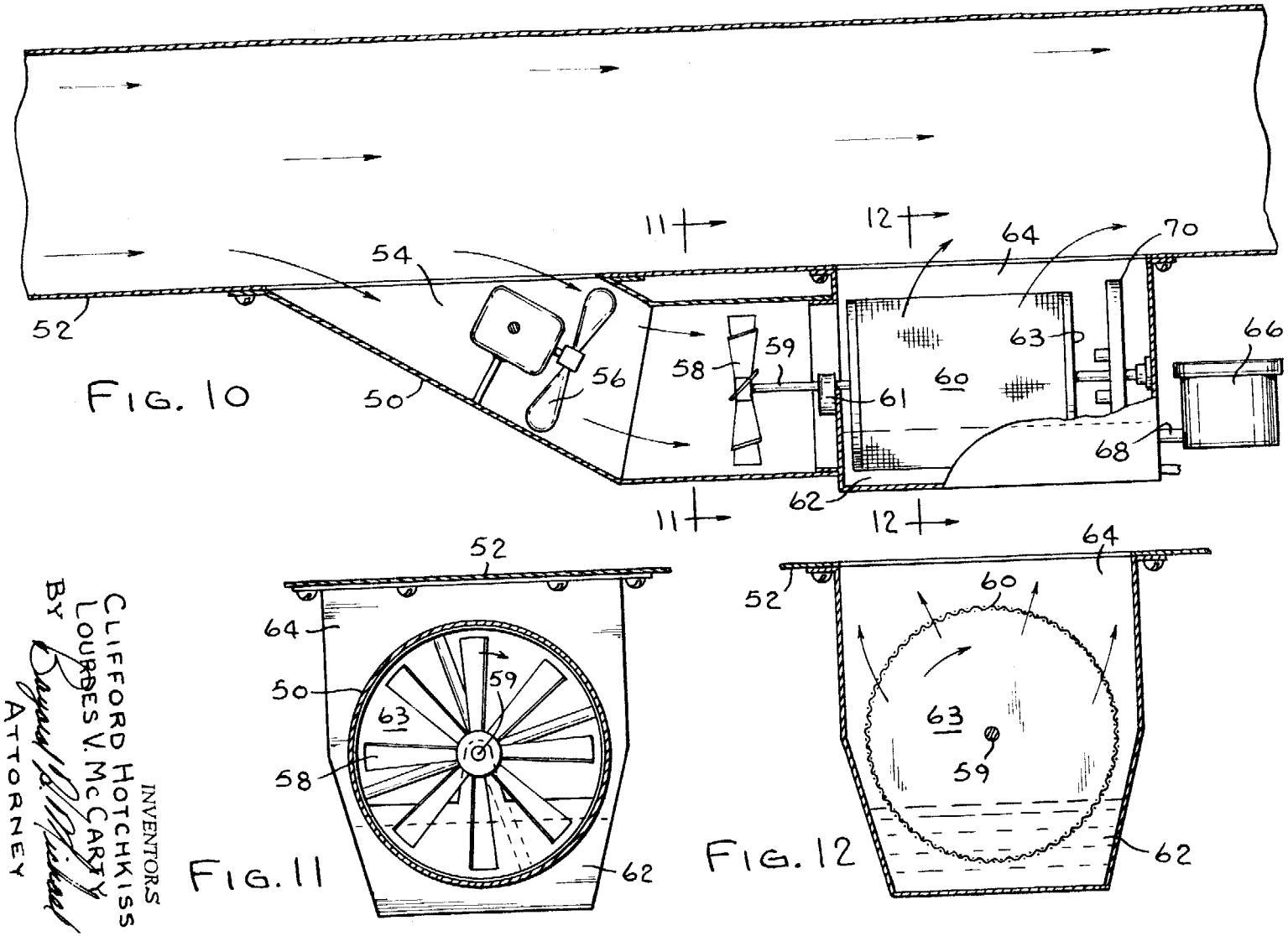
INVENTORS
CLIFFORD HOTCHKISS
LOURDES V. McCARTY
BY Bayard P. Michael
ATTORNEY United States Patent Office Re. 26,243
Reissued Aug. 1, 1967

26,243
HUMIDIFIER

Clifford Hotchkiss and Lourdes V. McCarty, Milwaukee, Wis., assignors, by mesne assignments, to The Lau Blower Company, Dayton, Ohio, a corporation of Ohio Original No. 3,189,328, dated June 15, 1965, Ser. No. 84,162, Jan. 23, 1961. Application for reissue Apr. 13, 1966, Ser. No. 547,084
5 Claims. (Cl. 261—28)

Matter enclosed in heavy brackets [ ] appears in the original patent but forms no part of this reissue specification; matter printed in italics indicates the additions made by reissue.

This invention relates to humidifiers for hot air heating systems.

Most humidifier installations do not provide a sufficient rate of evaporation to raise the humidity to the desired level within the space being heated. Even in humidifier installations which are initially capable of providing sufficient humidity, the efficiency of evaporation is soon impaired by "liming" which is the result of evaporation of water on the evaporating surfaces, leaving the minerals present in the water on the surfaces. In order to increase the evaporating capacity of the humidifier, larger units are used which are capable of raising the humidity level to a point where condensation will appear on the windows of the space being treated. These units cannot generally be completely shut down because the evaporating surface and reservoir remain in the hot air stream. Shut down is not a serious problem when the humidifier does not have adequate capacity to produce sufficient humidity, or has become inefficient because of "liming," but where the humidifier has sufficient capacity to overproduce, then the windows and walls will condense the moisture resulting in objectional sweating.

The primary object of the present invention is to provide a humidifier which reduces "liming" to a minimum.

Another object of the present invention is to provide a humidifier of high capacity in a small size.

These objects are attained by rotating a single screen or a series of screens partly through a water reservoir and partly through the hot air ducts in a heating system. As the screens rotate and water is evaporated, the mineral content of the water in the reservoir will rise. To reduce liming to a minimum under these conditions, a novel "wasting water" system is used to remove water from the reservoir to keep the mineral content down.

Other objects and advantages will be pointed out in, or be apparent from, the specification and claims, as will obvious modifications of the single embodiment shown in the drawings, in which:

FIG. 10 is a side elevation of a modified form of humidifier using a cylinder type screen evaporator;

FIG. 11 is taken on line 11—11 of FIG. 10 showing a front elevation of the cylindrical type humidifier; and FIG. 12 shows the air path through the cylindrical type humidifier.

Figure 1:
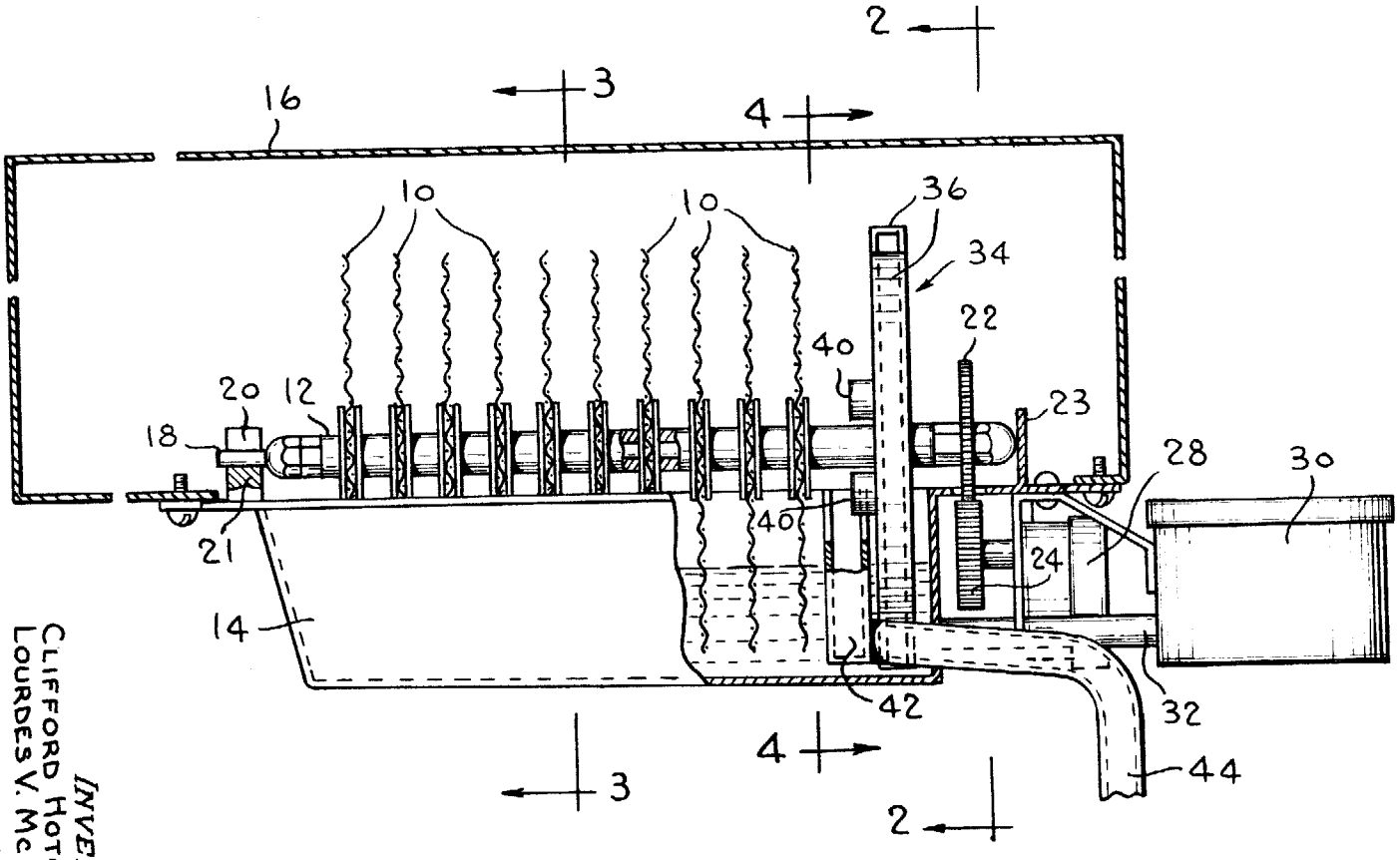
FIG. 1 is a side elevation of the humidifier partly broken away to show the screens.
Figure 2:
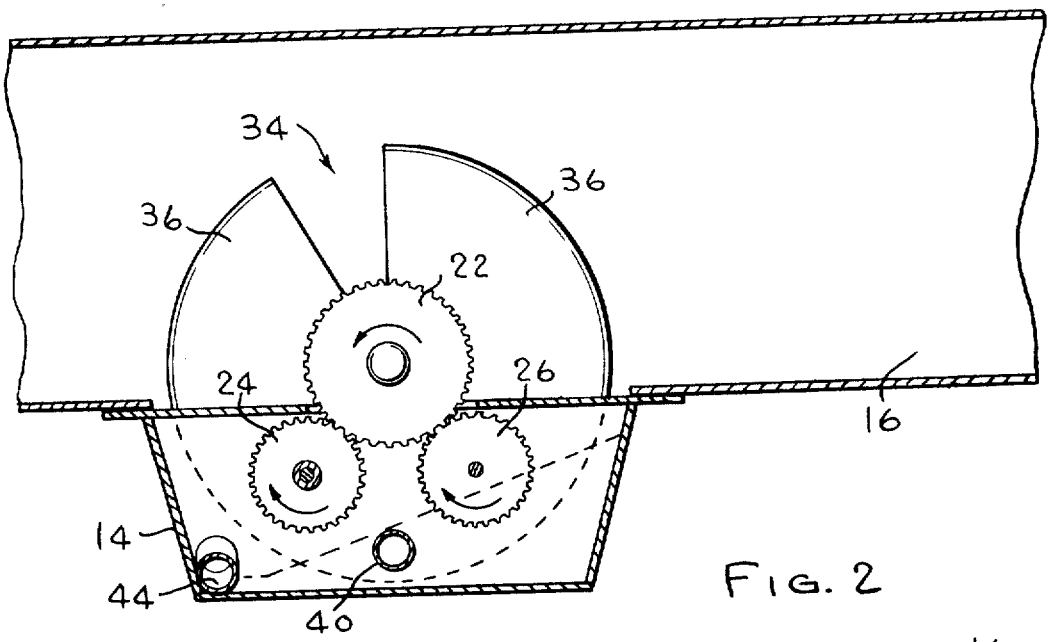
FIG. 2 is taken on line 2—2 of FIG. 1 showing an end view of the humidifier.
Figure 3:
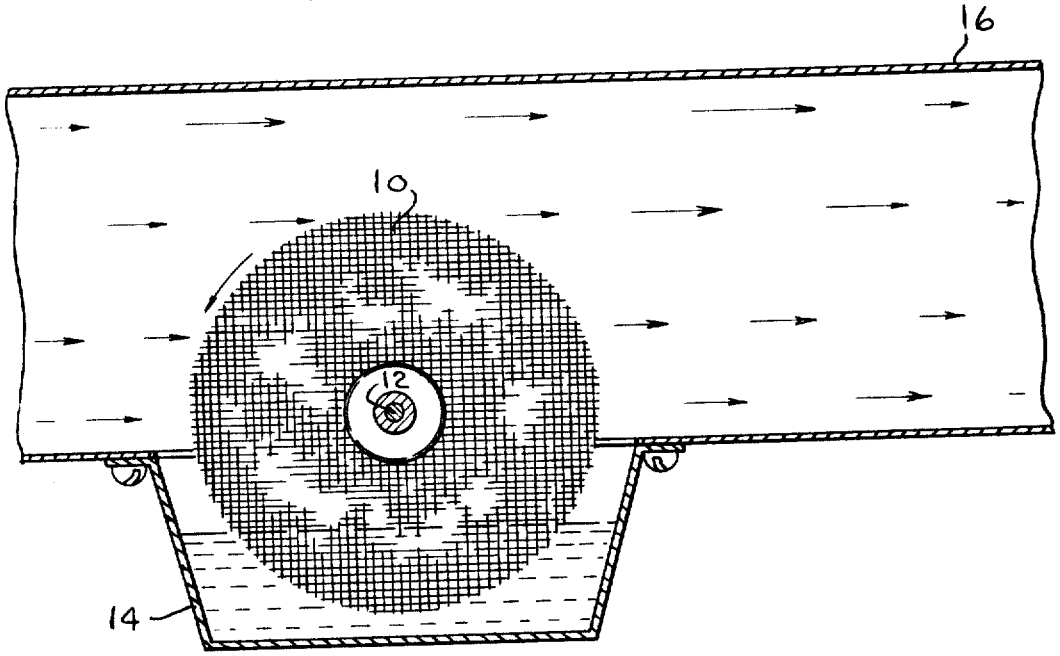
FIG. 3 is taken on the line 3—3 of FIG. 1 showing the humidifier in a hot air duct.
Figure 5:
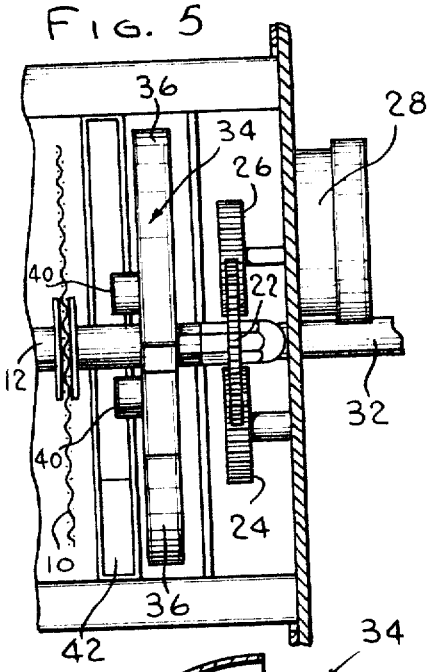
FIG. 5 is a top view of the humidifier showing the drive system.
Figure 4:
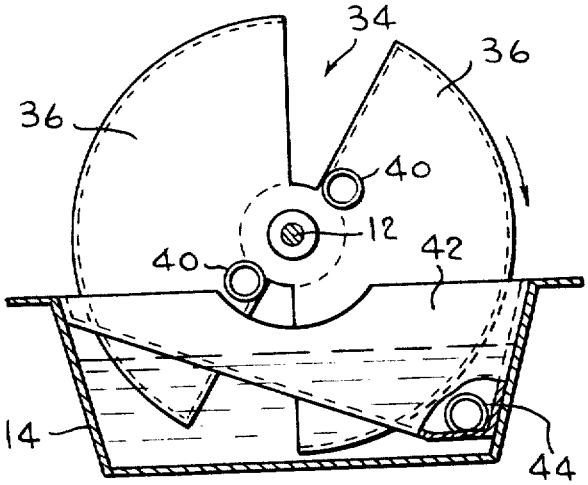
FIG. 4 is taken on line 4—4 of FIG. 1 showing the position of the scoops in the humidifier.
Figure 8:
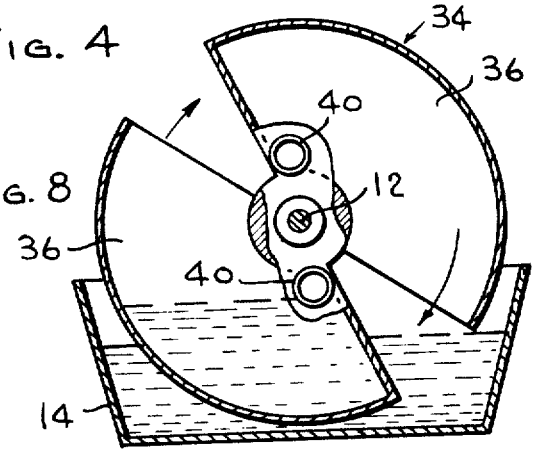
FIG. 8 shows the scoop rising up with the water entrapped therein.
Figure 6:
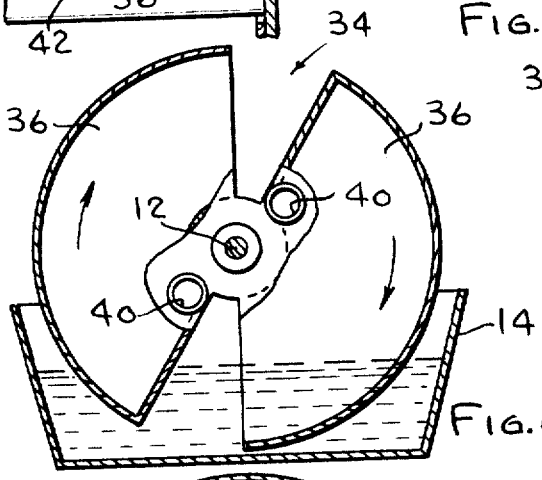
FIG. 6 is similar to FIG. 4 showing the position of the scoop as it enters the water reservoir.
Figure 9:
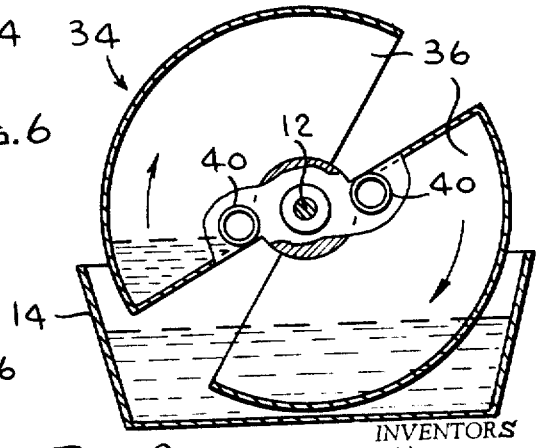
FIG. 9 shows the scoops repeating the cycle.
Figure 7:
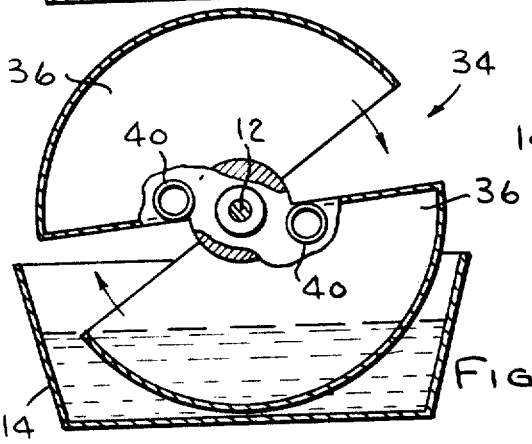
FIG. 7 shows the position of the scoop as the inlet reaches the top of the water in the reservoir.

As seen in the drawings, the humidifier includes a number of screens 10 mounted to rotate with shaft 12 with the lower portion of the screens passing through water reservoir 14. The reservoir is secured to one of the hot air ducts 16 of a heating system with the upper portion of the screen rotating through the duct. The shaft is provided on one end with stub shaft 18 which rides in slot 20 in bracket 21 and at the other end with gear 22 which rides on gears 24 and 26. The ends of the shaft abut brackets 21 and 23 holding the screens in position. The screens are rotated slowly by motor 28 driving gear 22 through gear 24. With this arrangement, the screens rotate through the reservoir and carry water into the flow path of the hot air in the duct for evaporation. The shaft and screens can be easily lifted out of the reservoir for replacement or repair by merely lifting the stub shaft clear of the slot and gear 22 off of gears 24 and 26.

The water level within the reservoir is maintained at a constant level by a conventional float type supply tank 30 connected to the reservoir by pipe 32. As pointed out above, evaporation of the water on the screens tends to increase the mineral content of the water in the reservoir. In order to maintain a desired mineral concentration in the water to reduce to a minimum the tendency to deposit and "lime" the reservoir, a novel bucket arrangement 34 is used to bail water from the reservoir, in effect wasting some of the water in the reservoir, so that more water is supplied to the reservoir than is evaporated. Buckets 36, 36 are mounted to rotate with shaft 12 and are open at the forward end forming scoops which move through the reservoir entrapping a portion of the water. As the buckets rotate out of the water, the water level rises in the buckets until it flows out through outlet 40 into pan 42 and out through drain pipe 44. The removal of water from the reservoir having a high mineral content and replacing this water with relatively low mineral content water keeps the mineral content at a level which reduces to a minimum the tendency of the minerals to deposit out and lime the reservoir. Since the mineral content of the water in the reservoir is kept low, any minerals which may deposit on the screens due to evaporation, either during rotation of the screens or when the screens are at rest, will be dissolved when the screen passes through the water in the reservoir.

As seen in the drawings, this humidifier is a complete package which can be easily attached to any hot air system by merely cutting a panel from the bottom of a hot air duct and attaching the reservoir to the duct. The humidifier can be shut down by stopping the rotation of the screens, which is generally satisfactory for complete shut down, except where the reservoir is installed too close to the plenum, causing the reservoir water to boil so that evaporation continues.

This system is not satisfactory for installation in a duct having a high velocity flow of hot air, since the water will be blown off of the screens, evaporating the water and leaving the minerals entrained in the air stream. The minerals will be dried by the hot air and blown into the space being heated in the form of dust. This problem can be overcome by using the system shown in FIGS. 10, 11 and 12, where an auxiliary duct 50 is secured to hot air duct 52 having inlet 54 through which hot air is drawn by motor driven fan 56. The hot air is blown against fan blades 58, secured to shaft 59 to slowly turn cylindrical screen 60 so that the lower portion of the screen passes through water reservoir 62. The air passes through the fan into the center of the screen and is blocked by plate 63 so that it passes out through the screen (FIG. 12) and then back to the main duct through outlet 64.

The water in the reservoir is maintained at a constant level by float type supply tank 66 through pipe 68. The screen is secured to shaft 59 rotatably supported by bearing 55 and connected to shaft 59 through reduction gearing 61. A bucket arrangement 70, similar to that described above, is mounted to rotate with shaft 59 to scoop water from the reservoir. Since any residue left on the screen after evaporation is washed off the screen by the water in the reservoir, the continuous changing of the water by the buckets keeps the mineral level in the reservoir below that considered objectionable. This arrangement is not limited to the cylindrical type screen, but can be modified to use the parallel type screen described previously. Since the normal flow of air through the duct 52 will not enter the auxiliary duct in sufficient volume to drive the fan and the screen, this system has the additional advantage of providing complete shut down when the humidity reaches a predetermined level in the space being heated because the main air stream does not contact the screen or reservoir after the fan has been turned off.

Although but two embodiments of the present invention have been illustrated and described, it will be apparent to those skilled in the art that various changes and modifications may be made therein without departing from the spirit of the invention or from the scope of the appended claims.

We claim:

1. In combination with a heating system having a hot air duct, an auxiliary duct having an inlet and outlet in communication with said hot air duct, fan means for carrying air from said hot air duct into said auxiliary duct, evaporator means in the auxiliary duct, means connected to said evaporator means and operative to actuate said evaporator means in response to operation of said fan means, said evaporator means including a reservoir and means for carrying water from said reservoir into the path of air flowing through said auxiliary duct, bailing means for wasting water from said reservoir, means for supplying fresh water to said reservoir to replace the water removed so that the humidity of the air in the hot air duct is increased and the water in said reservoir is continuously changed during operation of said evaporator means.

2. A humidifier according to claim 1 wherein said reservoir is generally dished and said evaporator means includes cylindrical screen means and means supporting said screen means for rotation by the air drawn through the auxiliary duct by said fan means, said cylindrical screen means arranged partially within said reservoir and extending exteriorly of the open end thereof for exposure to the air flowing through said auxiliary duct.

3. The humidifier according to claim 1 wherein said reservoir is generally dished and said evaporator means includes a number of parallel screens and means supporting said screens at the open end of said reservoir for rotation relative to said reservoir to carry water from said reservoir into the path of air flowing through said auxiliary duct.

*4. A humidifier as defined in claim 1 wherein said bailing means includes a plurality of bucket means mounted for movement with said evaporator means to scoop water from said reservoir for transfer to a position exterior of said reservoir.*

*5. A humidification system adapted for use in combination with a heating system having a hot air duct, said system comprising auxiliary duct means having an inlet and outlet adapted for communication with the hot air duct, fan means for effecting movement of air from the hot air duct into said auxiliary duct means, evaporator means in said auxiliary duct means, said evaporator means including a reservoir adapted to hold a preset depth of tap water therein, said evaporator means including an evaporation material mounted for movement in said auxiliary duct means and having a portion thereof submerged in said reservoir, water level control means for supplying and maintaining said preset depth of tap water in said reservoir, motor means connected to said material and operative to move said material in response to operation of said fan means through said reservoir to carry water from said reservoir into the path of air flowing through said auxiliary duct means so that the humidity of the air in the hot air duct is increased, and water bailing means operable in response to energization of said motor means for removing a controlled volume of water from said reservoir and said humidification system during the period that said motor means is moving said material through said reservoir, said water level control means supplying fresh water to said reservoir to replace the water removed to maintain said preset level so that the water in said reservoir is continuously changed during movement of said evaporator means to reduce the formation of deposits of minerals.*

References Cited

The following references, cited by the examiner, are of record in the patented file of this patent or the original patent.

UNITED STATES PATENTS

| | | | |
|---|---|---|---|
| 297,476 | 4/1884 | Wallace | 261—92 |
| 1,345,131 | 6/1920 | Cleworth | 261—92 |
| 1,587,277 | 6/1926 | Bolling | 126—113 XR |
| 1,826,508 | 10/1931 | Decker | 126—113 XR |
| 2,004,108 | 6/1935 | Grady | 261—92 |
| 2,035,628 | 3/1936 | Whitmer et al. | 261—91 X |
| 2,179,470 | 11/1939 | Larsen | 261—92 X |
| 2,440,446 | 4/1948 | Kenny | 261—92 |
| 2,537,211 | 1/1951 | Cox | 261—92 |
| 2,569,512 | 10/1951 | Bottum | 126—113 |
| 2,678,810 | 5/1954 | Chandler | 261—92 |
| 2,709,522 | 5/1955 | Osborne | 210—36 |
| 2,717,957 | 9/1955 | Ohlheiser | 219—20 X |
| 2,766,027 | 10/1956 | Herr | 261—91 |
| 2,838,294 | 6/1958 | Skerrit | 261—104 |
| 2,859,766 | 11/1958 | Shuldener | 261—112 X |
| 2,904,995 | 9/1959 | Obermaier | 73—17 |
| 2,967,050 | 1/1961 | Geen | 261—92 |
| 2,984,464 | 4/1961 | Herr. | |
| 3,055,645 | 9/1962 | Felderman | 261—91 X |
| 3,136,829 | 6/1964 | Skerritt. | |
| 3,193,259 | 7/1965 | Liebmann. | |

FOREIGN PATENTS

| | | |
|---|---|---|
| 462,115 | 12/1949 | Canada. |
| 154,884 | 5/1903 | Germany. |
| 5,293 | 1910 | Great Britain. |
| 149,276 | 3/1955 | Sweden. |

HARRY B. THORNTON, *Primary Examiner.*

TIM R. MILES, *Examiner.*